July 31, 1928.
A. F. PINKEL ET AL
1,679,004
APPARATUS FOR STORING AND CUTTING BLOCK MATERIAL
Original Filed Feb. 13, 1923
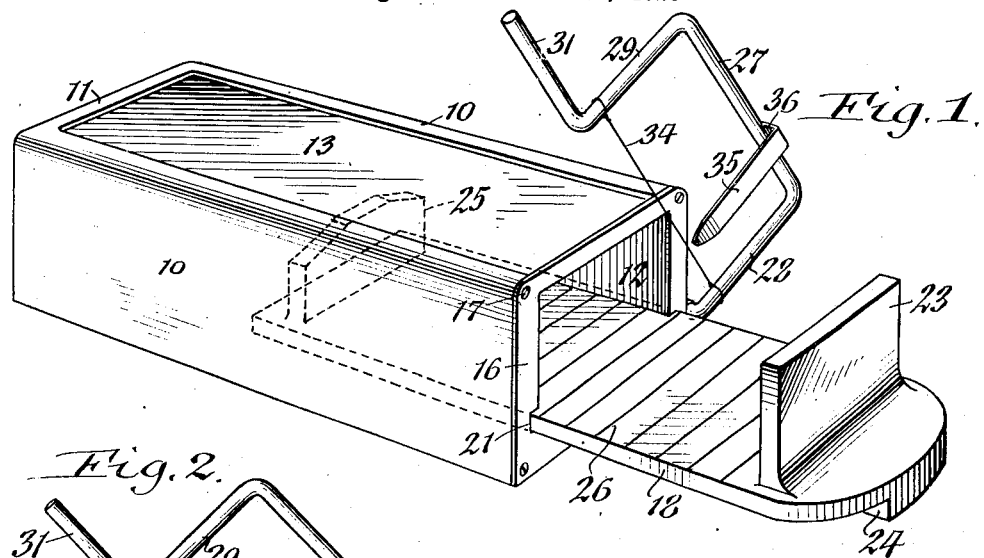
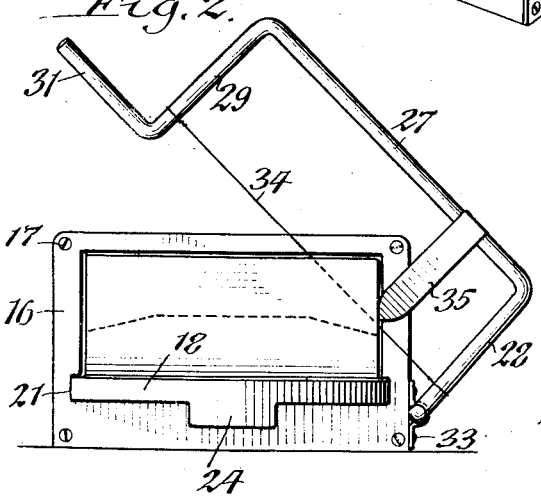
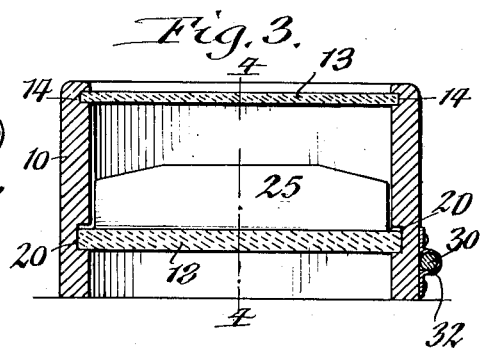
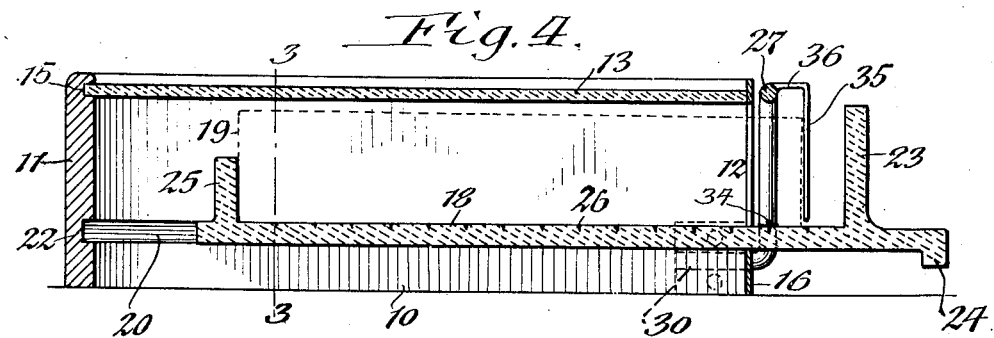

Patented July 31, 1928.

1,679,004

UNITED STATES PATENT OFFICE.

ALBERT F. PINKEL AND MATTHEW J. BRUNNER, OF BUFFALO, NEW YORK; SAID BRUNNER ASSIGNOR OF HIS ENTIRE RIGHT TO GOTTHOLD P. BERNER, OF BUFFALO, NEW YORK.

APPARATUS FOR STORING AND CUTTING BLOCK MATERIAL.

Application filed February 13, 1923, Serial No. 618,842. Renewed November 10, 1927.

This invention relates to an apparatus for storing blocks or cakes of yeast, ice cream, cheese and the like, so that the same are protected while not in use and for cutting slices or sections successively from this block of material when required, such an apparatus being particularly designated for use in stores where material of this character is dispensed from time to time to customers.

It is the object of this invention to provide an apparatus of this character which is simple and compact in construction, which permits of storing material when not in use and handling the same when required, in a sanitary and an appetizing manner, which permits of readily cutting successive slices or sections from the main block or cake of material, as the same is purchased at intervals by customers.

In the accompanying drawings:

Figure 1 is a perspective view of our improved storing and cutting apparatus showing the slide withdrawn from the enclosing casing and the cutter in a position ready for use. Figure 2 is a front elevation of the same. Figure 3 is a vertical cross section taken on line 3—3, Fig. 4. Figure 4 is a vertical longitudinal section, taken on the correspondingly numbered line in Fig. 3.

Similar characters of reference refer to like parts throughout the several views.

The enclosing casing of this apparatus may be variously constructed, but as shown in the drawings, the same preferably comprises two longitudinal side walls 10, 10 and a transverse end wall 11 connecting the rear ends of the side walls. The lower edges of these walls are not connected with each other so that the space between the same is open and the front ends of the side walls are also disconnected from each other, so as to form an inlet opening 12 between the same.

In order to permit of looking into the top of the casing for observing the amount and condition of the contents of the material therein, a horizontal plate 13, preferably of glass is mounted on the upper edges of the side and rear walls 10 and 11 by engaging the longitudinal edges of the plate with horizontal longitudinal grooves 14 formed on the upper parts of the inner surfaces of the side walls 10 and engaging the rear edge of this glass plate with the transverse groove 15 formed in the upper part of the inner surface of the rear wall 11, as shown in Figs. 3 and 4. The side and end walls of the casing are preferably made of wood, although other material may be used, if desired.

In order to tie the front ends of the side walls together and hold them in the proper relative position, as well as confining the glass top 13 in the grooves 14, 15, a transverse frame 16 of metal is secured to the front ends of the side walls by means of screws 17 or the like, so that it surrounds the inlet opening 12 and engages with the front edge of the glass 13.

Slidable lengthwise in the lower part of the enclosing casing and through the inlet opening and the frame 16 is a horizontal longitudinal shelf 18 which in effect forms the bottom of the enclosing casing and upon which rests the block of material 19, such as a large brick of yeast, ice cream or cheese, which is to be cut up into small slices or cakes and dispensed at retail to customers. This shelf slides at its opposite longitudinal edges in guideways or grooves 20 formed on the lower parts of the inner surfaces of the side walls 10 and notches 21 formed on the inner edges of the front frame 16 in line with the grooves 20. The rear end of the shelf 18 is adapted to engage with a transverse groove 22, in the lower part of the inner surface of the transverse wall 11 when the shelf is in its innermost or closed position. Near its outer front end the shelf 18 is provided with an upright front wall or shutter 23, which is adapted to enter the inlet opening 12 of the casing and close the same when the shelf is pushed into the case to the fullest extent, and thereby form a complete covering for the brick of yeast, ice cream, cheese or the like, which for the time being may be supported upon the upper side of the shelf within the casing. The shelf may be withdrawn from the casing for the purpose of exposing the brick of material to be cut up or to return the same into the casing, after the proper amount has been removed therefrom, the means for thus moving the shelf, as shown in Figs. 1, 2 and 4 consisting preferably of a downwardly projecting flange or finger piece 24 arranged on the front end of the shelf.

In order to insure withdrawal of the material from the casing with the shelf the latter is provided at its rear or inner end with an upwardly projecting follower 25 which is adapted to engage with the rear end of the brick of material 19 and positively withdraw the same from the casing. Although the shelf together with the shutter, finger piece and follower may be constructed of any suitable material and in any suitable manner, these several members are preferably constructed integrally of vitreous material, such as transparent glass which not only simplifies the construction and reduces the cost of manufacture, but also is highly sanitary on account of the fact that the same does not absorb any of the material resting upon the same and also because the same can be washed readily and conveniently, when necessary.

On its upper side the shelf is provided with a longitudinal row of graduations or marks 26 whereby the tradesman is enabled to determine or measure the thickness of the slice or section, which is to be cut from the block of material for sale to the customer. These graduations or marks may be produced by scoring or scratching the upper surface of the shelf crosswise from one longitudinal edge to the other, although the same may be otherwise formed, if desired.

When the shelf is moved into its innermost position, the material on the shelf is completely enclosed, thereby guarding against contamination of material from outside sources and causing the same to keep and remain in the best condition for a much longer period than if the same is exposed to the atmosphere. While the material is thus confined within the casing, the tradesman, by looking through the transparent top plate 13, can readily determine the condition of the contents and also the amount on hand and thus give notice when the supply needs replenishing.

Various means may be provided for cutting the slices or sections successively from the front or advancing end of the block of material resting on the shelf while the latter is withdrawn from the casing for rendering the front part of the block accessible. The means for this purpose which are shown in the drawings are preferred and constructed as follows:

Movable crosswise of the space in front of the inlet 12 of the enclosing casing or storage chamber is a bow having a longitudinal top bar 27 and depending arms 28, 29 at opposite ends of the top bar, a horizontal pintle or pivot pin 30 projecting rearwardly from the lower end of the arm 28 and journaled on one side wall of the casing, and a handle 31 projecting transversely from the lower end of the other arm 29. The pivotal mounting for the pintle 30 preferably consists of a bearing clip 32 which receives the pintle 30 and is secured to the lower part of the outer side of one of the longitudinal walls of the casing by means of nails 33 or other suitable means. This pintle can be slipped into and out of the bearing sleeve 32 for the purpose of dismantling the apparatus when it is desired to clean the same and also for the purpose of packing the same compactly when shipping the apparatus from the factory to a purchaser. The lower ends of the arms 28 and 29 are connected by a cutting wire 34 which may be fastened to these arms in any suitable manner, for instance, by twisting the same around these arms, as shown in the drawings. The upper bar 27 and arms 28, 29 of the bow together with the pintles 30 and 31 are preferably constructed from a single piece of wire, which is suitably bent for this purpose.

When it is desired to cut one or more sections, slices or small cakes from a brick of yeast or the like, the cutter is swung upwardly and laterally to one side of the path of the shutter and brick of material, so as to permit the latter to be withdrawn from the casing. After the shell has been withdrawn so as to bring the front end of the brick or block of the material the desired distance in front of the cutting wire 34, which may be readily determined by aid of the measuring graduations 26, the cutter is lowered, so that the wire 34 will pass downwardly through the same on a transverse line, and when this wire engages the top of the shelf a slice or cake of the material will have been severed from the block or brick which is ready to be served to the customer. The cutter is now again raised, the shelf is pushed in so that the shutter closes the inlet of the enclosing casing and thereafter the cutter may be again lowered along the outer side of the shutter, so that the apparatus is in compact form and can be readily stowed away in a refrigerator, if desired, for the purpose of keeping the contents of the casing fresh and in the most salable condition.

When using this apparatus for cutting material into slices which are usually purchased by customers in definite quantities or sizes, such as yeast cakes, which are now sold in the form of cakes of standard dimensions, means are provided whereby the cutter may be gaged with reference to the front end of the block of material, so as to permit of gaging this material with reference to the cutter preparatory to severing a slice therefrom.

A suitable form of such a gage consists of a gage finger 35 arranged in front of the path of travel of the cutting wire 34 at a distance equal to the slice to be cut from the block of material, this gaging finger being connected at its upper end by means of a cross piece 37 to the upper bar 27 of the cutter frame or bow, as shown in Figs. 1 and 4. In the use of the cutter with this guide, the same are moved to one side of the path of the block of material and the shelf is withdrawn until the front end of this block of material is transversely in line with the gage finger 35. Upon now depressing the cutter frame, the gage finger 35 will pass downwardly immediately in front of the block of material and the cutting wire will pass downwardly through this material at a distance in rear of its front end and thereby sever a small cake, slice or section from the same equal to the distance between the wire and the gage finger, as shown in Fig. 4. In this manner the material may be quickly severed into sections of equal or uniform thickness and thus save time during the busy hours of trade.

This device is not only useful for tradesmen for serving customers with sliced material, but the same may also be used to advantage in domestic circles when serving guests with slices of ice cream or other material.

Aside from the sanitary features of this apparatus and the advantage of facility in serving customers with slices of material of proper thickness, this device is further very desirable in that it is very attractive and induces the customer to purchase yeast and similar material which is cut from a large supply block or brick, instead of demanding individually wrapped cakes of yeast as has been the custom heretofore, thereby effecting a considerable economy in this respect.

We claim as our invention:

1. An apparatus of the character described comprising a casing having an opening at its front end and upper and lower longitudinal grooves on the upper and lower parts of the inner surface of its sides, a transparent plate engaging its longitudinal edges with said upper grooves and forming the top of said casing, a frame secured to the front end of said casing around said opening, and a shelf slidable with its longitudinal edges in said lower grooves and provided on its front part with a shutter for closing said opening.

2. An apparatus of the character described comprising a casing having an opening at its front end, a shelf slidable lengthwise in said casing and through said opening and having a shutter adapted to close said opening, a cutter movable across the front end of said casing, and a gage arranged forwardly beyond the cutting line of said cutter and mounted on the cutter so as to move simultaneously therewith across the front end of the casing.

ALBERT F. PINKEL.
MATTHEW J. BRUNNER.